May 27, 1941. F. B. WENDEL 2,243,809
METHOD OF MAKING HOLLOW WROUGHT METAL ARTICLES
Filed Oct. 3, 1934 3 Sheets—Sheet 1
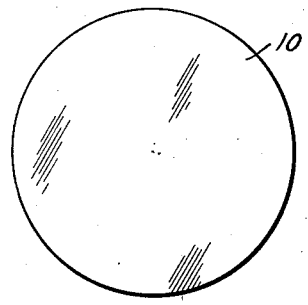
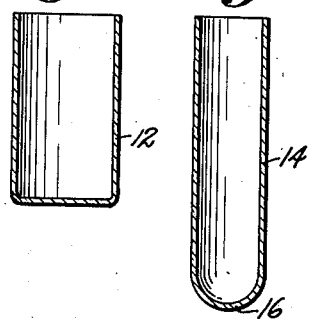
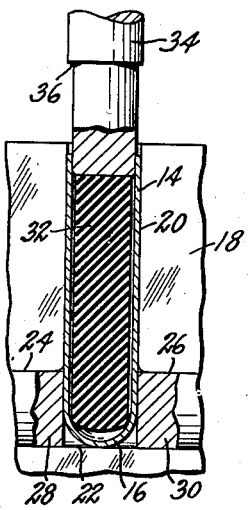
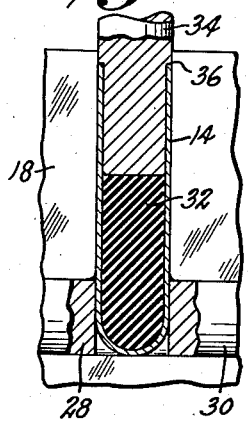
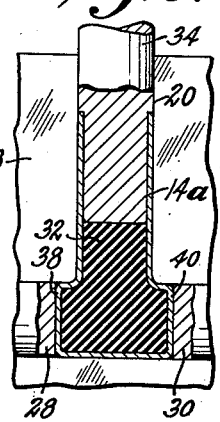
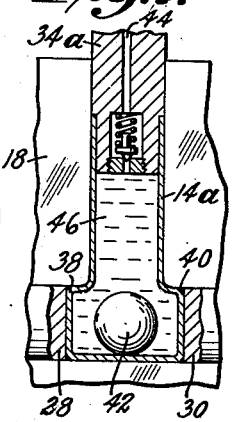
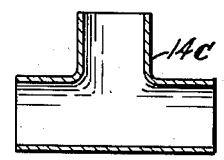
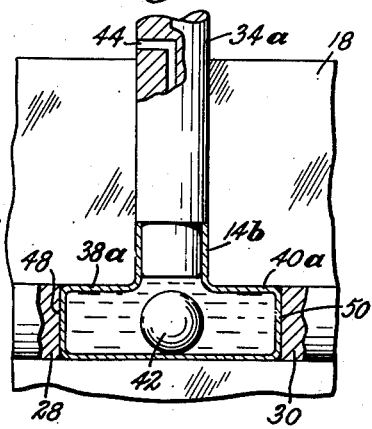
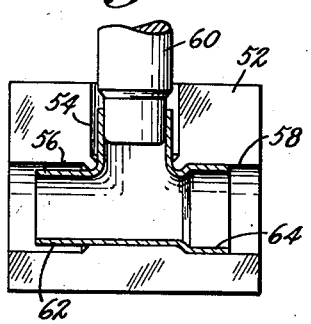
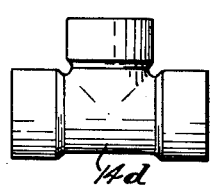
INVENTOR,
Frans B. Wendel
BY
ATTORNEY.

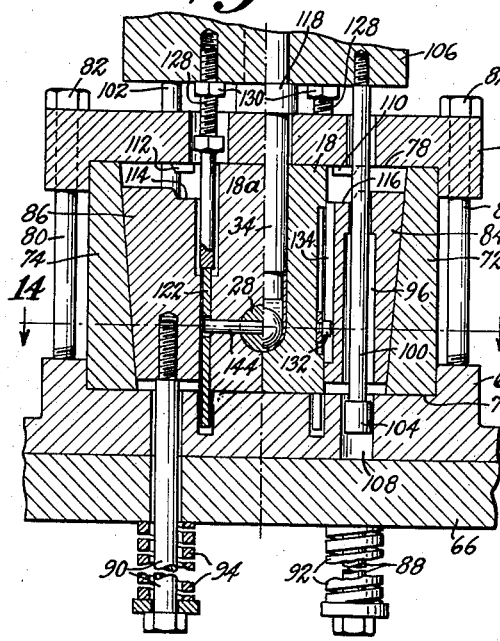
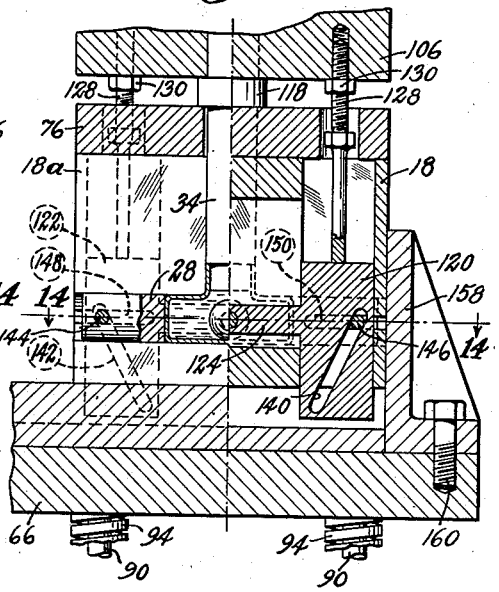
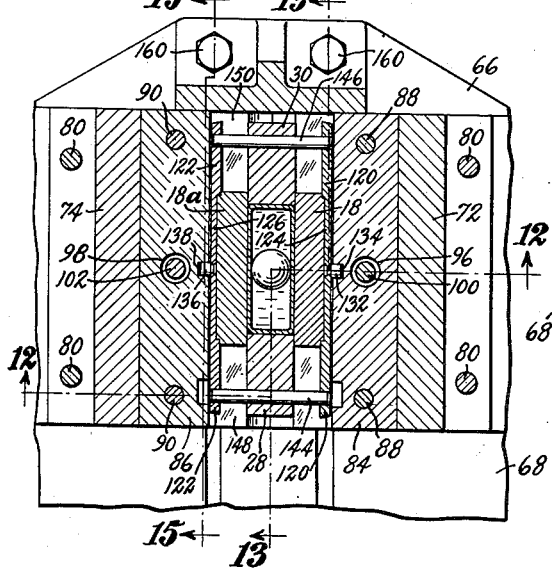
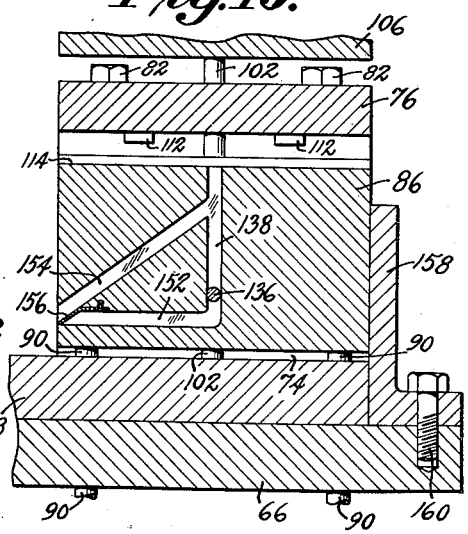

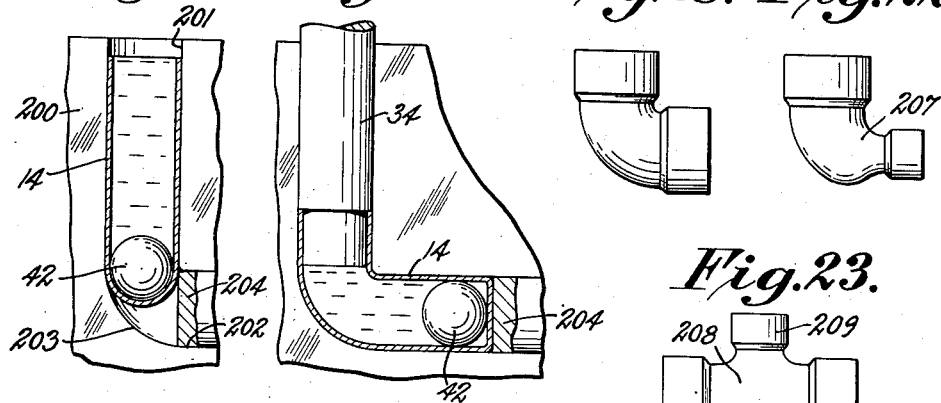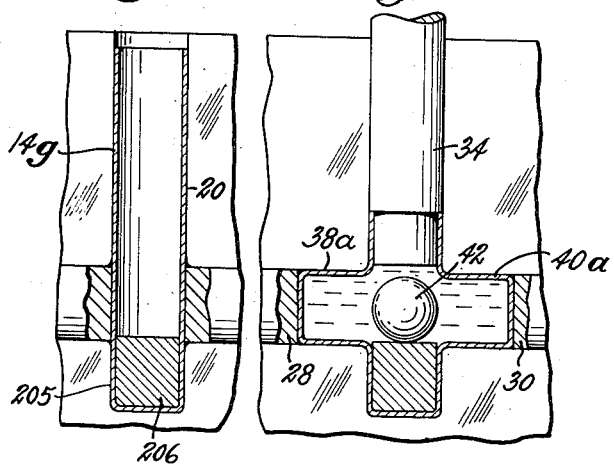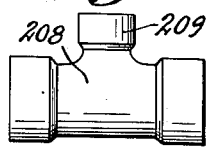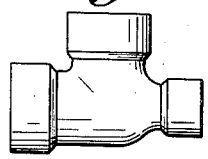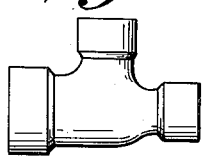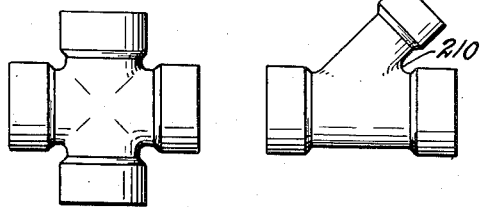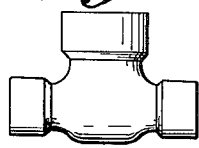

Patented May 27, 1941

2,243,809

UNITED STATES PATENT OFFICE 2,243,809

METHOD OF MAKING HOLLOW WROUGHT METAL ARTICLES

Frans B. Wendel, New York, N. Y., assignor, by direct and mesne assignments, to W. S. A., Incorporated, New York, N. Y., a corporation of New York Application October 3, 1934, Serial No. 746,658

4 Claims. (Cl. 29—157)

The present invention relates particularly to metal working, more particularly to the manufacture of cold-worked metal products and specifically to the manufacture of seamless pipe fittings of copper or like ductile metal. The invention is however applicable to a variety of materials.

A principal aim of the invention is to provide a novel method whereby seamless fittings of copper or the like may be produced which are of uniform thickness as to wall section, which provide for full flow of fluid through the fittings because of the absence of interior obstructions reducing the effective cross-sectional area of the fittings, which are of uniform high quality, and which fittings may for a given size of flow passage be more compact than seamless fittings which it has heretofore been possible to produce. It is an object of the invention to so produce cold-worked products by die operations as to avoid finishing operations after the die operations.

A further major aim of the invention is to produce as a new article of manufacture a seamless fitting of copper or the like formed from a plane blank of sheet metal stock. A further object is to provide a fitting having a better grain structure than has heretofore been possible.

The nature of the invention and the manner in which the above general and other and more detailed aims of the invention are attained and the advantages to be derived from its use may best be understood from a consideration of the following portion of this specification, in which will be described the steps of the process and the means whereby the invention may be carried into effect in the most advantageous manner at present known to me, and the resulting product.

In the accompanying drawings forming a part of this specification:

Fig. 1 shows in plan view a circular blank of sheet metal;

Fig. 2 shows in section and on enlarged scale a shell formed from the blank of Fig. 1;

Fig. 3 shows the shell after one or more further drawing operations;

Fig. 4 shows the shell of Fig. 3 inserted in a forming die;

Fig 5 shows the first die-forming operation or step partially completed;

Fig. 6 shows the completion of one stage of the preferred process;

Fig. 7 shows the shell in the forming die apparatus preparatory to a further operation;

Fig. 8 shows the completion of an intermediate die-forming operation;

Fig. 9 shows the fitting with the closed ends of the fitting severed;

Fig. 10 shows the fitting with a further die-forming operation partially completed;

Fig. 11 is a view of the finished fitting;

Fig. 12 is a section of die apparatus suitable for forming a T fitting, and taken on the line 12—12 of Fig. 14;

Fig. 13 is a section taken on the line 13—13 of Fig. 14;

Fig. 14 is a section taken on the line 14—14 of Figs. 12 and 13;

Fig. 15 is a section taken on the line 15—15 of Fig. 14;

Fig. 16 is a view showing a portion of die apparatus suitable for forming an elbow fitting;

Fig. 17 shows the apparatus of Fig. 16 at the end of the die-forming operation;

Fig. 18 shows the completed elbow fitting;

Figs. 19 and 20 are views similar to Figs. 16 and 17, respectively, showing die apparatus for forming a cross fitting;

Fig. 21 is a view of the completed cross fitting; and

Figs. 22 to 27 show other kinds of fittings formed in accordance with the invention.

Considering now more particularly Figs. 1 to 11, I have illustrated in these figures by way of example various of the steps employed in making a T-shaped fitting from a flat or plane blank of material. As will hereinafter in this specification more fully appear, the invention is not limited in its application to the production of any specific form of fitting, but may be equally well applied to produce other fittings of desired form, such as elbows and the like.

The material of which the blank shown in Fig. 1 is made may be any suitable ductile sheet metal such as copper, and it may here be pointed out that one of the advantages of the present invention is that it enables fittings to be made from flat sheet metal blanks rather than from tubing. In products of commercial grade, flat sheet metal blanks are more uniform in thickness than the walls of seamless tubing and consequently the difficulties heretofore encountered in the forming of fittings from tubing, due to inequalities in the thickness of the metal, are avoided by the present invention.

The circular blank indicated at 10 in Fig. 1 is first drawn to the form of a cylindrical cup or shell, as indicated at 12 in Fig. 2. This may be accomplished by one or more drawing operations, depending upon the character and dimensions of the metal, and such operations are effected in known manner by means of forming dies in a punch press, the material being cold-worked. The cup-shaped shell 12 shown in Fig. 2 is then further drawn in known manner in one or more operations to the form of an elongated cylindrical shell 14 having one of its ends cpen and its opposite end of hemispherical form, as shown at 16 in Fig. 3. By using punch press drawing operations on the flat blank, it is possible to form the shell 14 with uniform wall thickness and with straight walls and of good grain structure. These characteristics are important to subsequent operations. The shell 14 is then inserted in other suitable die apparatus, preferably comprising two cooperating die blocks, one of which is indicated at 18 in Fig. 4. The die blocks are formed to provide a cylindrical bore 20 intersecting at right angles a second cylindrical bore 22 having portions 24 and 26 at opposite sides of the bore 20. The die blocks mate on the common center planes of the bores. Reciprocable stop plugs 28 and 30 are situated respectively in portions 24 and 26 of bore 22. The shell 14 is inserted in the bore 20 with the bottom 16 resting on the bottom of the bore 22, and there is inserted in the shell a cylindrical core 32 of elastic and resilient material, preferably rubber. The rubber core 32 may be independent of, but is preferably attached to, the lower end of the die plunger 34.

In Fig. 4, the plunger and core are shown as inserted in the shell, and it will be noted that the core 32 is somewhat smaller in diameter (for example, a sixteenth of an inch) than the internal diameter of the shell 14 to provide a clearance space when the core is in its normal or uncompressed form.

In carrying out this stage of the process, the die plunger 34 moves downwardly from the position shown in Fig. 4 to the position shown in Fig. 5, this movement compressing the core 32 sufficiently so that it is deformed into contact with all of the wall surface of the shell below the lower end of the die plunger, and brings the shoulder 36 of the plunger into contact with the upper end of the shell 14. It is desirable in making a symmetrical fitting that the upper edge of the shell is in a true plane at right angles to the axis of the shell and that the shoulder on the die is true as I depend on compression of the material of the shell longitudinally within itself for the formation of the fitting and the force should therefore be distributed evenly between the shoulder and the top edge of the shell. Until the plunger 34 is moved to the position shown in Fig. 5 the stop plugs 28 and 30 remain in the positions shown in Figs. 4 and 5.

The die plunger 34 now moves from the position shown in Fig. 5 to the position shown in Fig. 6, while the stop plugs 28 and 30 are simultaneously retracted by suitable mechanism, such as that later described, to permit the shell to assume the form indicated at 14a in Fig. 6, in which the bottom portion of the shell is shaped outwardly in transverse direction as indicated at 38 and 40 against the ends of the stop plugs 28 and 30. In this operation, the rubber core 32 is reduced in longitudinal direction, and the bottom portion of the core is moved transversely as shown in the figure. The rubber core is not depended upon as a force-transmitting medium for producing the outwardly shaped portions 38 and 40, but these are produced by the flow of the metal longitudinally of itself under the influence of compression of the portion of the shell in the bore 20, coupled with the relieving of external pressure by the retraction of the stop plugs 28 and 30. The function of the core 32 is merely to keep the metal flowing adjacent the walls of the die blocks as it is deformed under the influence of compression transmitted to the lower portion of the shell through its wall structure. The rubber is obviously under some internal pressure but its pressure is not significant compared to the pressure transmitted through the shell itself. Without the rubber core, the material would buckle and wrinkle. It takes very little pressure in the rubber, compared with the compression pressure in the shell, to cause the metal to flow adjacent the die blocks. The rubber core is essentially a guide for the flowing metal. The stop plugs 28 and 30 are moved outwardly at such a rate that the internal volume occupied by the rubber core is substantially constant. With a fitting such as shown in which the bores are of the same diameter, this is accomplished by moving the stop plugs outwardly at half the speed of the plunger in its descent.

After the shell is brought to the form shown in Fig. 6, the plunger is withdrawn together with the core 32, which upon retraction of the plunger 34 assumes its original shape as shown in Fig. 4, and the shell 15 is then preferably removed from the die and annealed. The shell may be annealed between other steps in the process depending on circumstances. In some cases, all annealings may be avoided. After annealing, the shell 14a is replaced in the same or a similar die with a steel or very hard ball 42 disposed centrally within the bottom portion of the shell. The ball 42 is of the same diameter as the internal diameter of the main cylindrical portion of the shell and it will be evident that the ball is, when in the position shown in Fig. 7, in contact with the wall portion of the shell around the lower half of the circumference of the ball. A die plunger 34a having a bore 44, through which water or other liquid can pass, is then brought to the position shown in Fig. 7, the interior of the shell 14a being filled with liquid as indicated at 46.

The passage for water through the plunger is not necessary as the shell may be filled to the proper level with water before the plunger descends. The amount of water filled in may be measured or the plunger can be so made that excess water is expelled at its periphery. As in the case of the rubber, the water is a guide for flow of metal. As shown in the drawings, a check valve may be provided in the conduit 44 so that the water is prevented from having any pressure except that of the loading of the check valve. The water in any case must be trapped in the shell when the plunger exerts pressure on the material.

The plunger 34a now moves from the position shown in Fig. 7 to the position shown in Fig. 8, while stop plugs 28 and 30 are simultaneously retracted from the positions shown in Figs. 6 and 7 to the position shown in Fig. 8. Under the influence of the movement of plunger 34a to the position shown in Fig. 8, the liquid-filled shell assumes the shape indicated at 14b, in which the deformed portions at the lower end of the shell are elongated to the extent indicated at 38a and 40a. In certain cases I have found that in this die-forming operation the presence of the ball 42 is essential to the successful carrying out of this step of the process, since without this element the walls of the shell tend to buckle inwardly at the place where the ball is located. I might state that I have tried to make the fitting with the water and without the steel ball but with the water under little or no pressure, it will not prevent buckling at the center when used alone. The greatest stress is at the side centers of the bottom bore and the metal at these points needs a rigid reinforcement. In making a T fitting, I find that the ball automatically stays in the position shown in Fig. 8 while the plunger comes down and does not move into the side bores. This is undoubtedly due to the distribution of the metal from the center and the working of the metal around the corners between the bores.

After the forming to the extent indicated by Fig. 8, the shell 14b is removed from the die and the end walls 48 and 50 of the deformed portions 38a and 40a are severed in any suitable manner, as by sawing, to provide a semi-finished fitting of the form indicated at 14c in Fig. 9. I term the fitting 14c a semi-finished fitting although it will be evident that in one sense it is a complete T fitting suitable for butt connections or connections of the type in which the ends of the fitting are inserted in bell-mouthed pipe ends. The usual form of such fittings, however, is for the ends of the fittings to be bell-mouthed for the insertion of pipe ends, and in order to complete a fitting of suitable form I subject the fitting 14c to a further die-forming operation as shown in Fig. 10, in which the fitting is placed in die block apparatus of which one of the blocks is indicated at 52 in Fig. 10. In this apparatus the die blocks are provided with suitable bores indicated at 54, 56 and 58 which are of larger diameter than the exterior of the arms of the shell 14c. The end portions of the arms are then belled by the action of suitable shouldered die plungers, one of which is indicated at 60, which upon inward movement expand the arms from the form shown at 52 to the form shown at 64.

It will be obvious that the belling of the three arms of the T fitting may be accomplished by simultaneous inward movement of three separate plungers.

Fig. 11 shows the fitting 14b in completed form after the last die forming operation, which accomplishes the belling of the ends of the arms.

The fitting shown in Fig. 11 needs no machining when made according to the foregoing process. The walls are smooth internally and externally. There are no crude surfaces which need treatment. The wall thickness is substantially uniform. The grain structure is such that the fitting does not crack. Annealing of the fitting in its final shape is not necessary.

Referring now more particularly to Figs. 12 to 15 I have illustrated a suitable form of die apparatus for carrying the invention into effect in the formation of a T fitting of the kind described in connection with Figs. 1 to 11. In the apparatus described, a base 66 supports a table member 68 which may be secured to the base by any suitable means, such as bolts or the like (not shown). The table member 68 is recessed as at 70 to provide a seat for two spaced stationary wedge plates 72 and 74, which are clamped between the table member and the die-head 76 having a recess 78 in its lower face which forms a seat for the upper ends of the wedge members. The die-head is clamped to the table member by means of bolts 80 and nuts 82. Movable wedge members 84 and 86 are positioned inwardly of and adjacent to the stationary wedge members 72 and 74 respectively and have secured to their lower ends studs 88 and 90, which pass through suitable openings in the table member 68 and the base 66. The studs 88 are pulled downwardly by springs 92 and studs 90 are pulled downwardly by springs 94, the springs being compressed between the bottom face of the base 66 and suitable spring retainers at the lower ends of the studs. Situated between the movable wedge members 84 and 86 and pressed together by the downward wedging movement of these movable members are the die blocks 18 and 18a, which in the apparatus illustrated are provided with bores disposed in the manner described in connection with the preceding figures. The movable wedge members 84 and 86 are provided respectively with central vertical bores 96 and 98, these bores being shouldered and the upper ends being of smaller diameter than the lower ends. Retracting pins 100 and 102 are located respectively in the bores 96 and 98, the lower ends of these pins having enlarged heads, one of which is shown at 104 in Fig. 12, and the upper ends of the pins being attached to a ram member 106. The lower headed ends of the pins 100 and 102 can extend into suitable bores in the table member 68, one of said bores being indicated at 108 in Fig. 12.

As will be evident from Fig. 12 the die blocks 18 and 18a will be held together by the action of the wedge members under the influence of the springs 92 and 94, when the ram 106 is in the position shown in this figure. When the ram member is retracted, the heads of the retracting pins engage the shoulders in the bores 96 and 98 in the movable wedge members and lift these members against the action of the wedging springs 92 and 94 so as to release the pressure on the die blocks and to permit their removal laterally from the apparatus. The die head is preferably provided with two spreader blocks 110 and 112 projecting from its lower face and having oblique faces adapted to engage similar faces of notches 114 and 116 in the upper faces of members 84 and 86 respectively as the latter members approach the die head. The spreader blocks act to force the wedge members apart to provide clearance for facilitating removal of the die blocks. The retracting pins 100 and 102 and the studs 88 and 90 have sufficient flexibility, and the clearance provided by the openings through which these parts pass is sufficient to permit the lateral movement imposed on the wedge members by the spreader blocks.

The ram 106 carries the die plunger 34, which may advantageously have an enlarged portion 118 adapted to contact the upper face of the die head 76 to limit the downward stroke of the ram. Two H-shaped cam plates 120 and 122 are situated respectively between wedge block 84 and die 18, and wedge block 86 and die 18a. The lateral portions or legs of the plate 120 are connected by a web 124. The lateral portions or legs of the plate 122 are connected by a web 126. The upper ends of the legs of these cam plates are contacted by the lower ends of adjustable studs 128 projecting downwardly from the ram member 106 and provided with suitable lock nuts 130. A pin 132 is fixed to plate 120 and is adapted to slide in a vertical slot 134 in wedge member 84. A similar pin 136 fixed to plate 122 slides in slot 138.

The leg portions of cam plate 120 are provided with oblique slots, one of which is shown at 140 in Fig. 13, the slots in the two leg portions being oppositely oblique. Cam plate 122 is provided with similar oppositely oblique slots, one of which is indicated at 142 in Fig. 13. Pins 144 and 146, which pass through suitable bores in the stop plugs 28 and 30 respectively, have their ends located in slots 140 and 142, as appears more clearly from Fig. 14. The slots 148 and 150 in the die blocks permit inward and outward movement of pins 144 and 146.

As seen in Fig. 15, the inner face of the wedge member 86 is provided with a horizontal slot 152 intersecting the lower end of the vertical slot 138 and is further provided with a diagonal slot 154 meeting slot 152 at the edge of the block and intersecting vertical slot 138. A leaf spring 156 is fixed to the member 86 so as to provide a resilient closure opening outwardly for the end of the slot 152. The inner face of the opposite wedge member 84 is similarly slotted and provided with a spring corresponding to the spring 156 in block 86.

An angle plate 158 suitably secured to the table plate 68 and the base 66 as by stud 160 provides a lateral abutment for the die blocks.

From Figs. 12 and 13 it will be seen that the cam plates 120 and 122 are forced downwardly by the studs 128 as the ram descends on the working stroke of the die plunger to the position shown in the figures. The downward movement of these cam plates causes the oblique cam slots 140 and 142 to retract the stop plugs 28 and 30 through the medium of pins 144 and 146. The angle of the oblique slots is such that in making a T fitting of the kind shown in the figures each of the stop plugs is retracted by an amount equalling one-half the stroke of the plunger. When the ram reaches the lower end of its stroke the pins 132 and 136 are at the level at which pin 136 is shown in Fig. 15, that is, slightly above the lower end of the vertical slots. When the ram is retracted after the die forming operation, the retracting pins 100 and 102 lift the wedge members 84 and 86 as previously described, and the spacing studs 128 move away from the upper ends of the cam plates 120 and 122, the latter remaining in their lower position. The relative movement of the wedge members 84 and 86 with respect to the cam plates causes pin 136 to move to the lower end of the vertical slot 138 and likewise causes pin 132 to move to the lower end of the slot corresponding to slot 138. With the pins 132 and 136 in this position and with the wedge members 84 and 86 in their upward position and spread by the spreader blocks 110 and 112 the die blocks with the cam plates may be removed laterally from the die apparatus, the pins 132 and 136 passing through the horizontal slots of which slot 152 is shown in Fig. 15. After the die blocks are inserted with another shell, it will be evident that the stop plugs should be at the inner ends of their respective strokes, and if they are to be in this position the cam plates must be lifted. In order to lift the cam plates the diagonal slots and springs of which slot 54 and spring 156 are shown in Fig. 15 are provided, and it will be evident that as the die blocks are inserted laterally pins 132 and 136 will be prevented from entering their cooperating horizontal slots and will be forced by the springs 156 to enter the diagonal slots 154. Obviously, as the die blocks are pushed in laterally, with the pins in the diagonal slots, the inward movement of the die blocks will cause the cam plates to be lifted to their upper position, in which position the stop plugs are at the inner ends of their respective strokes. They are held in this position by friction.

Figs. 16 and 17 illustrate my method applied to the making of an elbow fitting. The process is preferably first carried out in accordance with Figs. 1, 2 and 3 forming the shell 14 open at the top and hemispherical at the bottom and of uniform wall thickness. The shell 14 is then placed within die blocks of which one is shown at 200, the other being a complementary die block. The die blocks form a vertical bore 201 and a horizontal bore 202 connected by a smooth bend 203. The steel ball 42 is inserted in the shell and water or other liquid filled into the shell as previously described. The operation takes place in the same manner as previously described, namely, by pressure longitudinally through the wall of the shell and without any substantial pressure being applied through the liquid or the steel ball. As the plunger 34 comes down on the shell in the die, the shell is moved downwardly and follows the wall of the die into the bore 202. A stop plug 204 is provided in the horizontal bore 202 which is retracted as the plunger 34 moves downwardly. In this case in order to keep a constant volume the stop plug will be moved outwardly at substantially the same rate as the plunger moves downwardly. Fig. 17 shows the plunger in its lowermost position and the stop plug 204 withdrawn to the end of its travel. The plunger is now retracted and the shell removed from the die. The center portion of the closed end of the shell is then dented inwardly to move the ball back slightly from the position shown in Fig. 17 and the dented end is thereafter cut off and the ball removed through this end of the shell. The shell is then ready for insertion into another die cooperating with plungers having shoulders for expanding the ends to the form shown in Fig. 18. The nature of this operation will be apparent from consideration of Fig. 10.

Figs. 19 and 20 show a variation of the process to make the type of fitting known as a cross, the final form of which is shown in Fig. 21. The shell in this case may be formed as shown at 14g in Fig. 19. This differs from the form shown in Fig. 3 in that the bottom end is squared off. The shell 14g is inserted in dies similar to those in Figs. 5, 6 and 7 except that the vertical bore 20 is extended downwardly below the horizontal bores to form a pocket 205 for receiving that part of the shell which is to form the additional or fourth connecting outlet. The shell is placed in the die with a filler member 206 of cylindrical shape and preferably made of steel inserted in the portion which is in the pocket 205. This filler plug 206 merely prevents the lower part of the shell from being distorted and no change in shape of this part takes place in the main die operation.

The operation takes place in the same way as described in connection with Figs. 5, 6 and 7, the lower portion of the shell merely being inert in the carrying out of the process. I may use the rubber filler 32 or not depending upon circumstances. The steel ball 42 is inserted as described together with liquid and the stop plugs 28 and 30 are retracted as previously described so that the branches 38a and 40a are formed. The filler material is then removed and the ends cut off and the fitting may be formed with widening open portions or may be left as indicated in Fig. 9.

Fig. 22 shows a fitting 207 made in accordance with my process, one end of which is smaller in diameter than the other. This may be accomplished by making the fitting with the two ends of equal diameter and then reducing one end in suitable reducing tools known per se. This may also be accomplished by expanding one or both ends. Fig. 23 shows a fitting 208 in which the end 209 is reduced. It will be clear how this fitting is made from consideration of the foregoing.

The same applies to the different shapes shown in Figs. 24 to 26. The Y connection shown in Fig. 27 is made by forming a T connection and reforming the same to the shape shown in Fig. 27. By employing my process a seamless Y or double Y connection can be made having a very short radius, shown at 210, which is not possible with methods heretofore known.

In some cases, where it is desired to produce asymmetrical fittings requiring substantially more flow of metal during the forming operation at one side of the bore 20 than at the other, the open end of the shell may be made diagonal or the shoulder on the plunger 34 may be made diagonal to produce more flow of metal during the working stroke of the plunger at the side of the shell where the additional flow is required.

In carrying out my process it is preferable that the material be made of good and uniform quality and in making fittings of copper only pure copper should be used for the best results.

It is possible to avoid the initial operation of drawing from a flat plate. A shell as shown in Fig. 3 may be made from solid stock by machining. However, I prefer to draw the material from a plate since this produces the best results. As indicated in the foregoing I may or may not use the rubber filler 32. Particularly in making small fittings this feature may be eliminated and the entire operation accomplished with the steel ball and liquid. Instead of water as a liquid I may use oil or grease or even comminuted material such as fine sand or powder of any kind. It will be appreciated that the invention is not limited to the making of fittings nor is it limited to treatment of metal as other substances may be treated in the same manner to form devices other than those used in the plumbing trade.

While I have described the method with particularity as required by the patent statutes, it is to be understood that the detail of descripion is not to be taken as limiting me in any way and it will be understood that the invention may be carried out in a great variety of structures and that many variations may be made from the foregoing disclosure without departing from the substance of the invention.

What I claim is:

1. The method of forming a wrought metal T which includes the steps of placing a shell blank having an open end and a hemispherical closed end in a die having a T shaped recess therein, with the closed end of the shell at the juncture of the branches of the recess and with the shell situated in the outlet branch recess, placing a rigid ball having a diameter substantially that of the internal diameter of the shell at the bottom of the shell, filling the remainder of the internal volume of the shell with liquid, applying end pressure to the open end of the shell to flow the material of the shell longitudinally of the wall thereof toward said juncture and guiding the material into the remaining branches of the die recess in contact with the wall of the die due to said ball and the liquid within the shell.

2. The method of forming a hollow metal article which includes placing a hollow shell having an open end in one of the recesses of a die having at least two connected tubular recesses, the axes of said recesses being substantially at right angles to each other, said die contacting the exterior surface of said shell, placing a rigid filling element within said shell and within the juncture of said tubular recesses, said filling element being of such size and shape as to engage and support a portion of said shell within said juncture against internal collapse, filling the remainder of the internal volume of the shell with liquid, then applying end pressure to the open end of the shell with the liquid trapped therein to flow the material of the shell parallel to the axis of said one of the recesses towards said juncture and laterally from the juncture in the form of a tubular branch into the other intersecting tubular recess and parallel to the axis thereof, and guiding the flowing material of the shell in contact with the walls of the die due to said liquid and said rigid filling element, the latter remaining within said juncture and continuing to engage and support against internal collapse a portion of said shell within said juncture during the metal flowing operation.

3. A method of forming a wrought metal T which includes the steps of placing a shell blank having an open end and a closed end in a die having a T-shaped recess therein, with the closed end of the shell at the juncture of the tubular branches of the recess and with the shell situated in the outlet branch recess, placing a rigid filling element within said shell and within said juncture, said filling element being of such size and shape as to engage and support a portion of said shell within said juncture against internal collapse, filling the remainder of the internal volume of the shell with liquid, then applying end pressure to the open end of the shell with the liquid trapped therein to flow the material of the shell parallel to the axis of said outlet branch recess toward said juncture and laterally from the juncture in the form of a tubular run into the other tubular branch recess, and guiding the flowing material of the shell in contact with the walls of the die due to said liquid and said rigid filling element, the latter remaining within said juncture and continuing to engage and support against internal collapse a portion of said shell within said juncture during the metal flowing operation.

4. A method of forming a wrought metal T which includes the steps of placing a shell blank having an open end and a closed end in a die having a T-shaped recess therein, with the closed end of the shell at the juncture of the tubular branches of the recess and with the shell situated in the outlet branch recess, placing a rigid ball within said shell and within said juncture, said ball being of the proper diameter as to engage and support a portion of said shell within said juncture against internal collapse, filling the remainder of the internal volume of the shell with liquid, then applying end pressure to the open end of the shell with the liquid trapped therein to flow the material of the shell parallel to the axis of said outlet branch recess toward said juncture and laterally from the juncture in the form of a tubular run into the other tubular branch recess, and guiding the flowing material of the shell in contact with the walls of the die due to said liquid and said ball, the latter remaining within said juncture and continuing to engage and support against internal collapse a portion of said shell within said juncture during the metal flowing operation.

FRANS B. WENDEL.